(12) United States Patent
Liu

(10) Patent No.: US 10,235,056 B2
(45) Date of Patent: Mar. 19, 2019

(54) STORAGE DEVICE HEALTH DIAGNOSIS

(71) Applicant: Western Digital Technologies, Inc., Irvine, CA (US)

(72) Inventor: Haining Liu, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 14/498,331

(22) Filed: Sep. 26, 2014

(65) Prior Publication Data

US 2016/0092120 A1    Mar. 31, 2016

(51) Int. Cl.
G06F 12/00    (2006.01)
G06F 3/06    (2006.01)
G06F 12/02    (2006.01)

(52) U.S. Cl.
CPC ............ *G06F 3/0616* (2013.01); *G06F 3/064* (2013.01); *G06F 3/0629* (2013.01); *G06F 3/0653* (2013.01); *G06F 3/0688* (2013.01); *G06F 12/0246* (2013.01); *G06F 2212/1016* (2013.01); *G06F 2212/1032* (2013.01); *G06F 2212/7205* (2013.01); *G06F 2212/7208* (2013.01); *G06F 2212/7211* (2013.01)

(58) Field of Classification Search
USPC ........................................................ 714/47.2
See application file for complete search history.

(56) References Cited

U.S. PATENT DOCUMENTS

| 7,512,847 | B2 | 3/2009 | Bychkov et al. |
| 8,032,724 | B1 * | 10/2011 | Smith ................. G06F 12/0269 |
| | | | 711/159 |
| 8,078,918 | B2 | 12/2011 | Diggs et al. |
| 8,122,185 | B2 | 2/2012 | Merry, Jr. et al. |
| 8,140,739 | B2 | 3/2012 | Langlois et al. |
| 8,176,367 | B2 | 5/2012 | Dreifus et al. |

(Continued)

FOREIGN PATENT DOCUMENTS

| CN | 103559115 A | 2/2014 |
| WO | WO-2014/105829 A2 | 7/2014 |

OTHER PUBLICATIONS

"Understanding Endurance and Performance Characteristics of HP Solid State Drives," Hewlett Packard, Technology Brief, 2012, 11 pp. (Note: Applicant points out in accordance with MPEP 609.04(a) that the 2012 year of publication is sufficiently earlier than the effective U.S. filing date and any foreign priority date of Sep. 26, 2014 so that the particular month of publication is not in issue.).

(Continued)

*Primary Examiner* — Kamini B Patel
(74) *Attorney, Agent, or Firm* — Morgan, Lewis & Bockius LLP

(57) ABSTRACT

A storage device may include a plurality of memory devices logically divided into a plurality of blocks and a controller. In some examples, the controller may be configured to determine a respective fullness percentage for each respective block of the plurality of blocks; determine the smallest fullness percentage for the plurality of respective fullness percentages; and responsive to determining that the smallest fullness percentage exceeds a predetermined threshold value, perform an action related to health of the storage device.

19 Claims, 6 Drawing Sheets

(56) References Cited

U.S. PATENT DOCUMENTS

| | | |
|---|---|---|
| 8,422,303 B2 | 4/2013 | Franca-Neto et al. |
| 8,489,966 B2 | 7/2013 | Schuette et al. |
| 8,516,343 B2 | 8/2013 | Flynn et al. |
| 8,644,099 B2 | 2/2014 | Cometti et al. |
| 2003/0056134 A1* | 3/2003 | Kanapathippillai .. G06F 1/3203 713/324 |
| 2004/0111583 A1* | 6/2004 | Han .................... G06F 12/0246 711/203 |
| 2005/0204187 A1* | 9/2005 | Lee .................... G06F 12/0246 714/6.13 |
| 2007/0043923 A1* | 2/2007 | Shue .................... G06F 3/0605 711/170 |
| 2007/0174551 A1* | 7/2007 | Cornwell ............ G06F 12/0888 711/118 |
| 2009/0157974 A1 | 6/2009 | Lasser |
| 2009/0172250 A1* | 7/2009 | Allen ................... G06F 12/0246 711/103 |
| 2009/0259797 A1* | 10/2009 | Meir ................... G06F 12/0246 711/103 |
| 2010/0037001 A1* | 2/2010 | Langlois ............. G06F 12/0246 711/103 |
| 2010/0306577 A1* | 12/2010 | Dreifus .................. G11C 29/76 714/6.12 |
| 2011/0055455 A1* | 3/2011 | Post .................... G06F 12/0246 711/103 |
| 2011/0320724 A1* | 12/2011 | Mejdrich ................ G06F 13/28 711/125 |
| 2012/0030409 A1* | 2/2012 | Post .................... G06F 12/0246 711/103 |
| 2012/0084489 A1* | 4/2012 | Gorobets ............ G06F 12/0246 711/103 |
| 2013/0166824 A1* | 6/2013 | Shim .................. G06F 12/0246 711/103 |
| 2013/0185587 A1 | 7/2013 | Brown et al. |
| 2014/0095827 A1* | 4/2014 | Wei ..................... G06F 12/0246 711/203 |
| 2014/0181369 A1* | 6/2014 | Horn ................... G06F 12/0246 711/103 |
| 2015/0127621 A1* | 5/2015 | Kuo .................. G06F 17/30156 707/692 |
| 2015/0143203 A1* | 5/2015 | Kim .................... G06F 11/0793 714/773 |

OTHER PUBLICATIONS

Hutchinson, Solid-state Revolution: In-depth on how SSDs Really Work, ARS Technica, Jun. 4, 2012, 23 pp.

Jurenka, "Exploring Managed Nand Media Endurance," Thesis Paper, Master of Science in Computer Engineering, Boise State University, May 2010, 69 pp.

First Office Action from counterpart Great Britain application No. GB1516823.0, dated Feb. 18, 2016, 6 pp.

Response to First Office Action from counterpart Great Britain application No. GB1516823.0, dated Feb. 18, 2016, filed Sep. 26, 2016, 15 pp.

Second Office Action from counterpart Great Britain application No. GB1516823.0, dated Nov. 9, 2016, 4 pp.

Response to Second Office Action from counterpart Great Britain application No. GB1516823.0, dated Nov. 9, 2016, filed Jan. 9, 2017, 15 pp.

\* cited by examiner

STORAGE DEVICE HEALTH DIAGNOSIS

TECHNICAL FIELD

This disclosure relates to storage devices, such as solid state drives.

BACKGROUND

Solid-state drives (SSDs) may be used in computers in applications where relatively low latency and high capacity storage are desired. For example, SSDs may exhibit lower latency, particularly for random reads and writes, than hard disk drives (HDDs). This may allow greater throughput for random reads from and random writes to a SSD compared to a HDD. Additionally, SSDs may utilize multiple, parallel data channels to read from and write to memory devices, which may result in high sequential read and write speeds.

SSDs may utilize non-volatile memory devices, such as flash memory devices, which continue to store data without requiring persistent or periodic power supply. Flash memory devices are written and erased by applying a voltage to the memory cell. The voltage used to erase the flash memory devices may be relatively high, and may cause physical changes to the flash memory cell over many erase operations. Because of this, flash memory cells may wear out after many erase operations, reducing their ability to store charge, and reducing or eliminating the ability to write new data to the flash memory cells.

SUMMARY

In some examples, the disclosure describes a storage device that includes a plurality of memory devices logically divided into a plurality of blocks and a controller. In some examples, the controller may be configured to determine a respective fullness percentage for each respective block of the plurality of blocks; determine the smallest fullness percentage for the plurality of respective fullness percentages; and responsive to determining that the smallest fullness percentage exceeds a predetermined threshold value, perform an action related to health of the storage device.

In some examples, the disclosure describes a method including determining, by a controller of a storage device, a respective fullness percentage for each respective block of a plurality of blocks of the storage device; determining, by the controller, the smallest fullness percentage for the plurality of respective fullness percentages; and responsive to determining that the smallest fullness percentage exceeds a predetermined threshold value, performing, by the controller, an action related to health of the storage device.

In some examples, the disclosure describes a computer-readable storage medium comprising instructions that, when executed, configure one or more processors of a storage device to determine a respective fullness percentage for each respective block of a plurality of blocks of the storage device; determine the smallest fullness percentage for the plurality of respective fullness percentages; and, responsive to determining that the smallest fullness percentage exceeds a predetermined threshold value, perform an action related to health of the storage device.

In some examples, the disclosure describes a system including means for determining a respective fullness percentage for each respective block of a plurality of blocks of the storage device. The system also may include means for determining the smallest fullness percentage for the plurality of respective fullness percentages. In accordance with these examples, the system also may include means for performing, responsive to determining that the smallest fullness percentage exceeds a predetermined threshold value, an action related to health of the storage device.

The details of one or more examples are set forth in the accompanying drawings and the description below. Other features, objects, and advantages will be apparent from the description and drawings, and from the claims.

BRIEF DESCRIPTION OF DRAWINGS

FIG. 8 is a plot of the average garbage collection start versus over-provisioning ratio for an example storage device.

DETAILED DESCRIPTION

Figure 1:
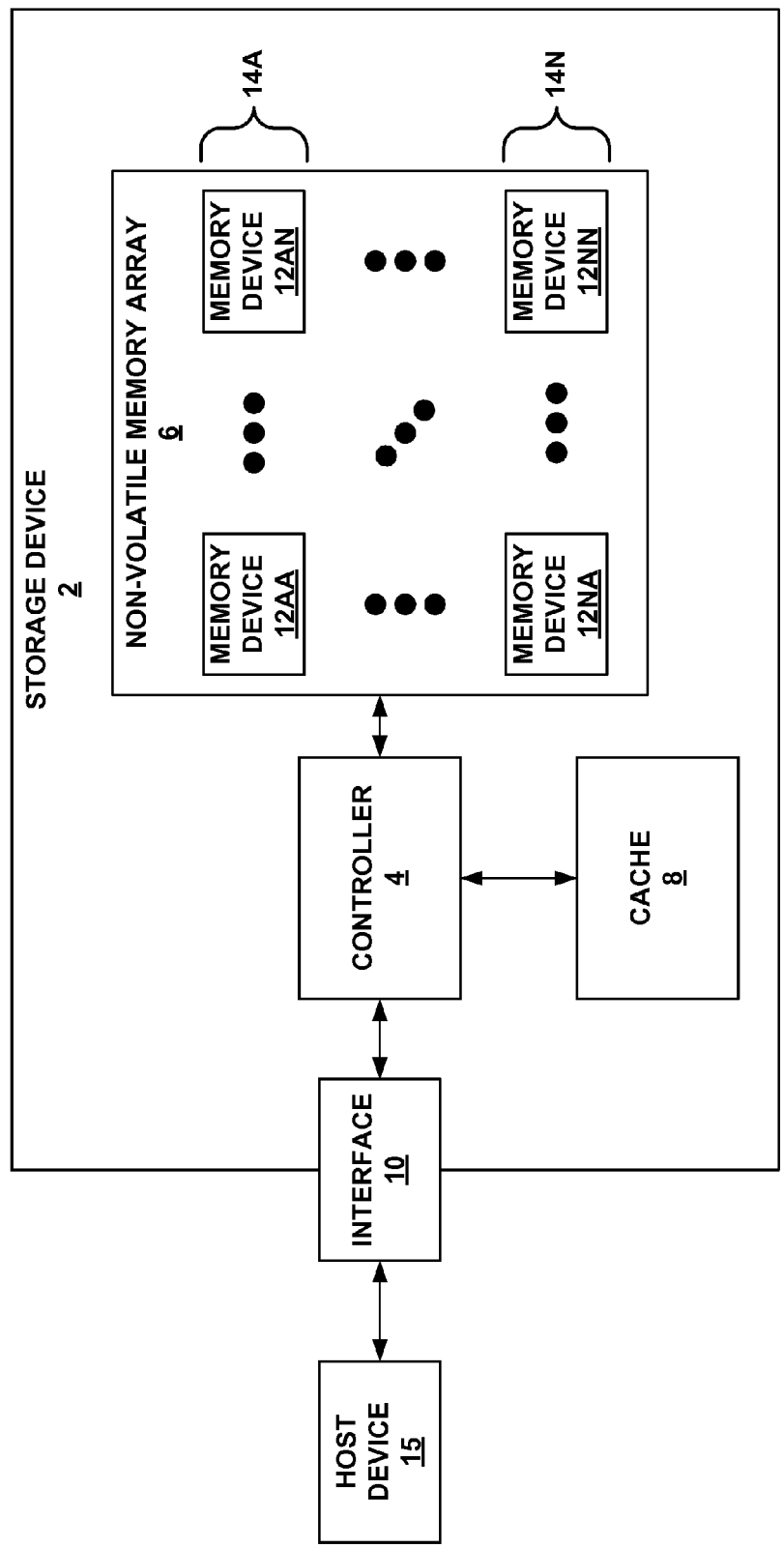
FIG. 1 is a conceptual and schematic block diagram illustrating an example system including a storage device connected to a host device.

The disclosure describes technique for tracking health of a storage device, such as a solid state drive (SSD). In some examples, the technique may utilize one or more parameters tracked by a controller of the storage device as part of garbage collection operations of the storage device. A storage device may include memory devices that each includes a plurality of blocks, each block including memory cells that store data. A controller of a storage device may determine a fullness percentage for each block of the storage device while performing garbage collection. The fullness percentage refers to a ratio of the valid data stored in a block compared to the total capacity of the block. The controller then may determine the smallest fullness percentage across the blocks. The controller may compare this smallest fullness percentage to a predetermined threshold value. If the smallest fullness percentage is greater than the threshold value, this may indicate that the health of the storage device is deteriorating. The health of the storage device may be related to a number of free blocks in the storage device. If the number of free blocks becomes low, the controller may be unable to perform sufficient wear leveling and garbage collection to maintain performance of the storage device. If the number of free blocks is too low, the controller may not be able to recover the lost performance or new data may not be able to be written to the storage device. Thus, determining when the health of the storage device is deteriorating before the health deteriorates so far as to be unrecoverable is important to continued operation of the storage device.

In some examples, for each garbage collection operation, the controller may determine the smallest fullness percentage. The controller then may determine an average smallest fullness percentage for a predetermined number of most recent smallest fullness percentages. By averaging the smallest fullness percentages for each of a plurality of most recent garbage collection operations, the controller may smooth the value of the smallest fullness percentage over the plurality of most recent garbage collection operations. The controller then may compare this average smallest fullness percentage to the threshold value.

The controller may perform one or more predetermined operations responsive to determining that the average smallest fullness percentage is greater than the threshold value. For example, the controller may modify an operating parameter or output an indication of the storage device health to a host device of the storage device.

In this way, the controller of the storage device may monitor health of the storage device in run-time using a single value or an average of a single value over a plurality of operations. This single value or average of a single value is then compared to a threshold value to make a determination of storage device health. Thus, the storage device health monitoring may be relatively lightweight and low overhead. Additionally, the techniques described herein utilize a parameter tracked during garbage collection.

In comparison, some techniques for estimating storage device health are implemented by a host device and require the host device to calculate a write amplification factor based on raw storage device statistics (such as the amount of data the host device has instructed the storage device to write and the amount of data the storage device has actually written, including data written during writes, garbage collection, wear leveling, and the like). The host device then estimates the storage device health based on the calculated write amplification factor. Collecting raw storage device statistics and calculating the write amplification factor may introduce a delay in determining the storage device health, which may delay intervention if the storage device health has deteriorated. In some examples, the delay may be so severe that the storage device enters a state from which the storage device cannot recover. In contrast to these techniques, the techniques described herein may not require determination of a write amplification factor based on actual write statistics and/or may be implemented by the storage device controller, rather than the host device. As such, the techniques described herein may allow earlier detection or prediction of deterioration of storage device health and may reduce or eliminate the likelihood that the storage device will enter a state from which the storage device cannot recover.

FIG. 1 is a conceptual and schematic block diagram illustrating an example system including a storage device 2 connected to a host device 15. Host device 15 may utilize non-volatile memory devices included in storage device 2 to store and retrieve data. Host device 15 may include any computing device, including, for example, a computer server, a network attached storage (NAS) unit, a desktop computer, a notebook (e.g., laptop) computer, a tablet computers, a set-top box, a mobile computing device such as a "smart" phone, a television, a camera, a display device, a digital media player, a video gaming console, a video streaming device, or the like.

As illustrated in FIG. 1 storage device 2 may include controller 4, non-volatile memory array 6 (NVMA 6), cache 8, and interface 10. In some examples, storage device 2 may include additional components not shown in FIG. 1 for sake of clarity. For example, storage device 2 may include power delivery components, including, for example, a capacitor, super capacitor, or battery; a printed board (PB) to which components of storage device 2 are mechanically attached and which includes electrically conductive traces that electrically interconnect components of storage device 2; or the like. In some examples, storage device 2 includes a solid state drive (SSD).

Storage device 2 may include interface 10 for interfacing with host device 15. Interface 10 may provide a mechanical connection, and electrical connection, or both to host device 15. Interface 10 may include one or both of a data bus for exchanging data with host device 15 and a control bus for exchanging commands with host device 15. Interface 10 may operate in accordance with any suitable protocol. For example, interface 10 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), and PCI-express. The electrical connection of interface 10 (e.g., the data bus, the control bus, or both) is electrically connected to controller 4, providing electrical connection between host device 15 and controller 4, allowing data to be exchanged between host device 15 and controller 4.

Storage device 2 may include NVMA 6 which may include a plurality of memory devices 12AA-12NN (collectively, "memory devices 12") which may each be configured to store and/or retrieve data. For instance, a memory device of memory devices 12 may receive data and a message from controller 4 that instructs the memory device to store the data. Similarly, the memory device of memory devices 12 may receive a message from controller 4 that instructs the memory device to retrieve data. In some examples, each of memory devices 12 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

Figure 2:
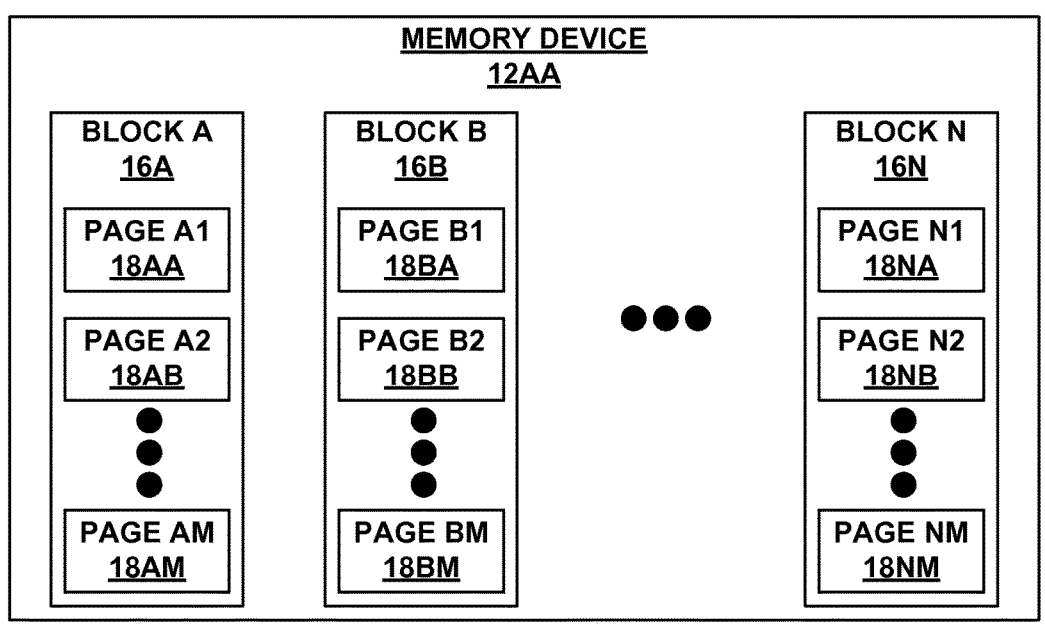
FIG. 2 is a conceptual block diagram illustrating an example memory device 12AA that includes a plurality of blocks, each block including a plurality of pages.

In some examples, memory devices 12 may include flash memory devices. Flash memory devices may include NAND or NOR based flash memory devices, and may store data based on a charge containing in a floating gate of a transistor for each flash memory cell. In NAND flash memory devices, the flash memory device may be divided into a plurality of blocks. FIG. 2 is a conceptual block diagram illustrating an example memory device 12AA that includes a plurality of blocks 16A-16N (collectively, "blocks 16"), each block including a plurality of pages 18AA-18NM (collectively, "pages 18"). Each block of blocks 16 may include a plurality of NAND cells. Rows of NAND cells may be serially electrically connected using a word line to define a page (one page of pages 18). Respective cells in each of a plurality of pages 18 may be electrically connected to respective bit lines. Controller 4 may write data to and reads data from NAND flash memory devices at the page level and erase data from NAND flash memory devices at the block level.

In some examples, it may not be practical for controller 4 to be separately connected to each memory device of memory devices 12. As such, the connections between memory devices 12 and controller 4 may be multiplexed. As an example, memory devices 12 may be grouped into channels 14A-14N (collectively, "channels 14"). For instance, as illustrated in FIG. 1, memory devices 12AA-12AN may be grouped into first channel 14A, and memory devices 12NA-12NN may be grouped into $N^{th}$ channel 14N. The memory devices 12 grouped into each of channels 14 may share one or more connections to controller 4. For instance, the memory devices 12 grouped into each of first channels 14A may be attached to a common I/O bus and a common control bus. Storage device 2 may include a common I/O bus and a common control bus for each respective channel of channels 14. In some examples, each of channels 14 may include a set of chip enable (CE) lines which may be used to multiplex memory devices on each channel. For example, each CE line may be connected to a respective memory device of memory devices 12. In this way, the number of separate connections between memory devices 12 may be reduced. Additionally, as each channel has an independent set of connections to controller 4, the reduction in connections may not significantly affect the data throughput rate as controller 4 may simultaneously issue different commands to each channel.

In some examples, storage device 2 may include a number of memory devices 12 selected to provide a total capacity of that is greater than the capacity accessible to host device 15. This is referred to as over provisioning. For example, if storage device 2 is advertised to include 240 GB of user-accessible storage capacity, storage device 2 may include sufficient memory devices 12 to give a total storage capacity of 256 GB. The 16 GB of storage devices 12 may not be accessible to host device 15 or a user of host device 15. Instead, the additional storage devices 12 may provide additional blocks 16 to facilitate writes, garbage collection, wear leveling, and the like. Further, the additional storage devices 12 may provide additional blocks 16 that may be used if some blocks wear to become unusable and are retired from use. The presence of the additional blocks 16 may allow retiring of the worn blocks without causing a change in the storage capacity available to host device 15. In some examples, the amount of over-provisioning may be defined as $p=(T-D)/D$, wherein p is the over-provisioning ratio, T is the total number of blocks of storage device 2, and D is the number of blocks of storage device 2 that are accessible to host device 15.

Figure 3:
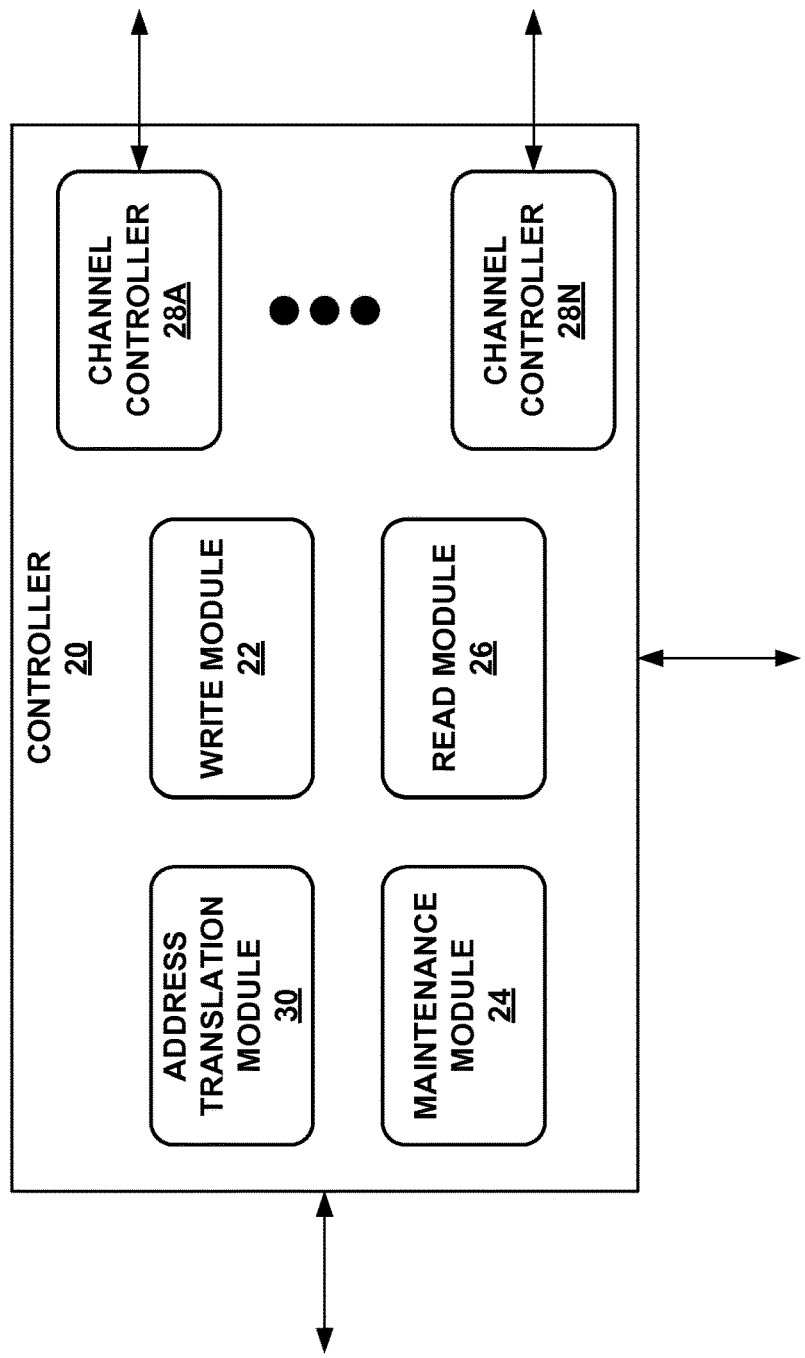
FIG. 3 is a conceptual and schematic block diagram illustrating an example controller.

Storage device 2 includes controller 4, which may manage one or more operations of storage device 2. FIG. 3 is a conceptual and schematic block diagram illustrating an example controller 20, which may be an example of controller 4 in FIG. 1. In some examples, controller 20 may include a write module 22, a maintenance module 24, a read module 26, a plurality of channel controllers 28A-28N (collectively, "channel controllers 28"), and an address translation module 20. In other examples, controller 20 may include additional modules or hardware units, or may include fewer modules or hardware units. Controller 20 may include a microprocessor, digital signal processor (DSP), application specific integrated circuit (ASIC), field programmable gate array (FPGA), or other digital logic circuitry.

Controller 20 may interface with the host device 15 via interface 10 and manage the storage of data to and the retrieval of data from memory devices 12. For example, write module 22 of controller 20 may manage writes to memory devices 12. For example, write module 22 may receive a message from host device 15 via interface 10 instructing storage device 2 to store data associated with a logical address and the data. Write module 22 may manage writing of the data to memory devices 12.

For example, write module 22 may communicate with address translation module 20, which manages translation between logical addresses used by host device 15 to manage storage locations of data and physical block addresses used by write module 22 to direct writing of data to memory devices. Address translation module 30 of controller 20 may utilize a flash translation layer or table that translates logical addresses (or logical block addresses) of data stored by memory devices 12 to physical block addresses of data stored by memory devices 12. For example, host device 15 may utilize the logical block addresses of the data stored by memory devices 12 in instructions or messages to storage device 2, while write module 22 utilizes physical block addresses of the data to control writing of data to memory devices 12. (Similarly, read module 26 may utilize physical block addresses to control reading of data from memory devices 12.) The physical block addresses correspond to actual, physical blocks (e.g., blocks 16 of FIG. 2) of memory devices 12.

In this way, host device 15 may be allowed to use a static logical block address for a certain set of data, while the physical block address at which the data is actually stored may change. Address translation module 20 may maintain the flash translation layer or table to map the logical block addresses to physical block addresses to allow use of the static logical block address by the host device 15 while the physical block address of the data may change, e.g., due to wear leveling, garbage collection, or the like.

As discussed above, write module 24 of controller 20 may perform one or more operations to manage the writing of data to memory devices 16. For example, write module 24 may manage the writing of data to memory devices 16 by selecting one or more blocks within memory devices 16 to store the data and causing memory devices of memory devices 16 that include the selected blocks to actually store the data. As discussed above, write module 24 may cause address translation module 30 to update the flash translation layer or table based on the selected blocks. For instance, write module 24 may receive a message from host device 4 that includes a unit of data and a logical block address, select a block within a particular memory device of memory devices 16 to store the data, cause the particular memory device of memory devices 16 to actually store the data (e.g., via a channel controller of channel controllers 28A-28N that corresponds to the particular memory device), and cause address translation module 30 to update the flash translation layer or table to indicate that the logical block address corresponds to the selected block within the particular memory device.

The flash translation layer or table also may facilitate division of data received from host device 15 across a plurality of physical block addresses. For example, in some instances, the data received from host device 15 may be in units that are larger than a single block. As such, controller 20 may select multiple blocks to each store a portion of the unit of data. As opposed to selecting multiple blocks within a single memory device of memory devices 12 to store the portions of the unit of data, controller 20 may select blocks from a plurality of memory devices 12 to store the portions of the unit of data. Controller 20 may then cause the plurality of memory devices 12 to store the portions of the unit of data in parallel. In this way, controller 20 may increase the rate at which data may be stored to memory devices 12 by writing portions of the data to different memory devices 12, e.g., connected to different channels 14.

In order to write a bit with a logical value of 0 (charge) to a bit with a previous logical value of 1 (uncharged), a large current is used. This current may be sufficiently large that it may cause inadvertent changes to the charge of adjacent flash memory cells. To protect against inadvertent changes, an entire block of flash memory cells may be erased to a logical value of 1 (uncharged) prior to writing any data to cells within the block. Because of this, flash memory cells may be erased at the block level and written at the page level.

Thus, to write even an amount of data that would consume less than one page, controller 20 may cause an entire block to be erased. This may lead to write amplification, which refers to the ratio between the amount of data received from host device 14 to be written to memory devices 12 and the amount of data actually written to memory devices 12. Write amplification contributes to faster wearing of the flash memory cells than would occur with no write amplification. Wear to flash memory cells may occur when flash memory cells are erased due to the relatively high voltages used to erase the flash memory cells. Over a plurality of erase cycles, the relatively high voltages may result in physical changes to the flash memory cells. Eventually, the flash memory cells may wear out, such that data may no longer be written to the cells.

One technique that controller 20 may implement to reduce write amplification and wear of flash memory cells includes writing data received from host device 14 to unused (or free) blocks (e.g., blocks 16 of FIG. 2) or partially used blocks. For example, if host device 14 sends data to storage device 2 that includes only a small change from data already stored by storage device 2, controller 20 may mark the old data as stale or invalid and write the new data to an unused block(s). Over time, this may reduce a number of erase operations blocks are exposed to, compared to erasing the block that holds the old data and writing the updated data to the same block.

Because empty (or free) blocks contain no existing data, free blocks may be written to without first erasing data stored by the block. Hence, writing to free blocks may be faster than writing to previously full or partially full blocks. Writing to free blocks may also reduce wear to memory devices 12, due to the lack of an erase operation before the writing operation. In some examples, storage device 2 may include sufficient memory devices 12 to maintain a pool of free blocks, F, to maintain write speeds and reduce wear of memory devices 12. The number of free blocks, F, is related to the over-provisioning ratio, p, as the number of free blocks, F, is equal to the number of user accessible blocks, D, subtracted from the total number of blocks, T (F=T−D).

Responsive to receiving a write command from host device 15, write module 22 may determine at which physical locations (blocks 16) of memory devices 12 to write the data. For example, write module 22 may request from address translation module 30 or maintenance module 24 one or more physical block addresses that are empty (e.g., store no data), partially empty (e.g., only some pages of the block store data), or store at least some invalid (or stale) data. Upon receiving the one or more physical block addresses, write module 22 may communicate a message to one or more of channel controllers 28A-28N (collectively, "channel controllers 28"), which causes the channel controllers 28 to write the data to the selected blocks.

Read module 26 similarly may control reading of data from memory devices 12. For example, read module 26 may receive a message from host device 15 requesting data with an associated logical block address. Address translation module 30 may convert the logical block address to a physical block address using the flash translation layer or table. Read module 26 then may control one or more of channel controllers 28 to retrieve the data from the physical block addresses.

Each channel controller of channel controllers 28 may be connected to a respective channel of channels 14. In some examples, controller 20 may include the same number of channel controllers 28 as the number of channels 14 of storage device 2. Channel controllers 28 may perform the intimate control of addressing, programming (or writing), erasing, and reading of memory devices 12 connected to respective channels, e.g., under control of write module 22, read module 26, and/or maintenance module 24.

Maintenance module 24 may be configured to perform operations related to maintaining performance and extending the useful life of storage device 2 (e.g., memory devices 12). For example, maintenance module 24 may implement at least one of wear leveling or garbage collection.

As described above, erasing flash memory cells may use relatively high voltages, which, over a plurality of erase operations, may cause changes to the flash memory cells. After a certain number of erase operations, flash memory cells may degrade to the extent that data no longer may be written to the flash memory cells, and a block (e.g., block 16 of FIG. 2) including those cells may be retired (no longer used by controller 20 to store data). To increase the amount of data that may be written to memory devices 12 before blocks are worn and retired, maintenance module 24 may implement wear leveling.

In wear leveling, maintenance module 24 may track a number of erases of or writes to a block or a group of blocks, for each block or group of blocks. Maintenance module 24 may cause incoming data from host device 15 to be written to a block or group of blocks that has undergone relatively fewer writes or erases, to attempt to maintain an approximately equal number of writes or erases for each block or group of blocks. This may cause each block of memory devices 12 to wear out at approximately the same rate, and may increase the useful lifetime of storage device 2.

Although this may reduce write amplification and wear of flash memory cells by reducing a number of erases and writing data to different blocks, this also may lead to blocks including some valid (fresh) data and some invalid (stale) data. To combat this, controller 20 may implement garbage collection. In a garbage collection operation, controller 20 may analyze the contents of the blocks of memory devices 12 to determine a block that contain a high percentage of invalid (stale) data. Controller 20 then may rewrite the valid data from the block to a different block, then erase the block. This may reduce an amount of invalid (stale) data stored by memory devices 12 and increase a number of free blocks, but also may increase write amplification and wear of memory devices 12.

In accordance with one or more examples of this disclosure, storage device 2 (e.g., maintenance module 24) may monitor a health of storage device 2 using at least one parameter determined during garbage collection operations. For example, for each garbage collection operation, maintenance module 24 may determine a fullness percentage for each block of storage devices 12. The fullness percentage refers to the ratio between the amount of valid data stored by the block and the total capacity of the block. A lower fullness percentage indicates that the block stores a lower percentage of valid data. For example, a fullness percentage of 0% indicates that the block stores no valid data and a fullness percentage of 100% indicates that all data stored by the block is valid. Maintenance module 24 may use the fullness percentages during the garbage collection to determine which blocks contain some valid data and some invalid data, and may redistribute the data within storage devices to combine data from partially filled blocks to free up empty blocks. The smallest fullness percentage is referred to herein as "C".

Figure 4:
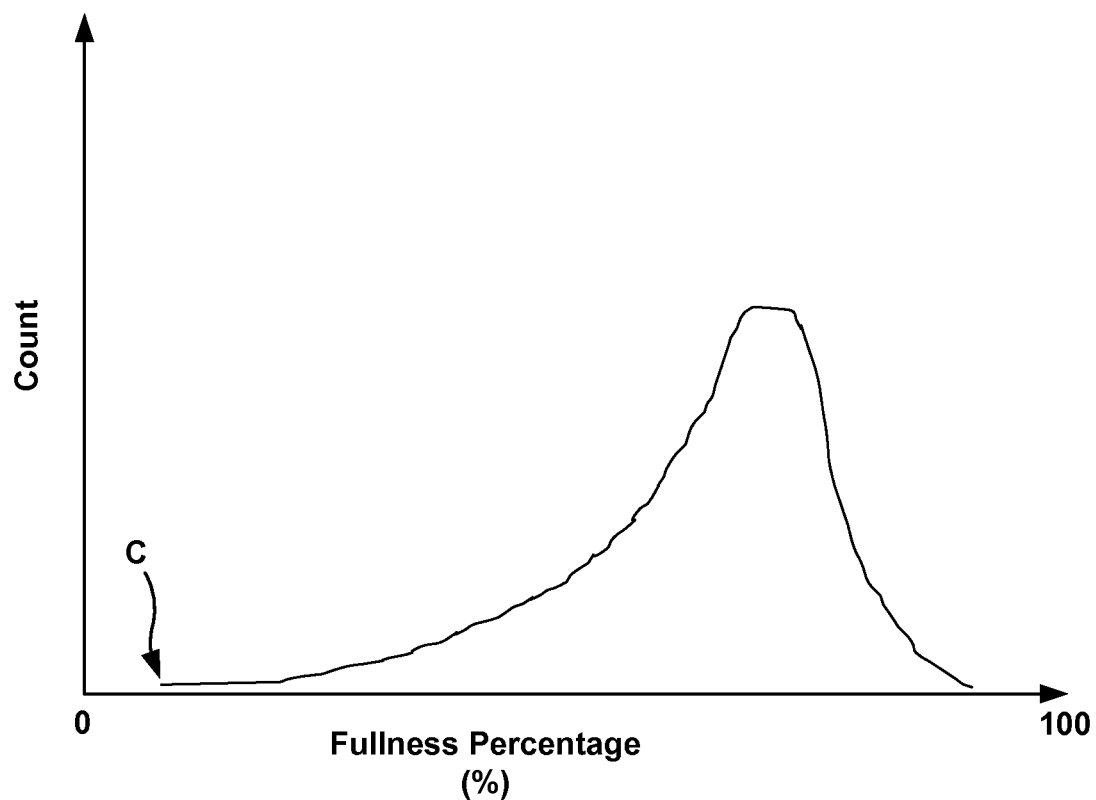
FIG. 4 is an example plot illustrating a distribution of blocks as a function of fullness percentage during steady operation of a storage device.

FIG. 4 is an example plot illustrating a distribution of blocks as a function of fullness percentage during steady operation of a storage device. As shown in FIG. 4, the number of blocks with a given fullness percentage may follow a unimodal distribution profile, with a relatively longer tail toward low fullness percentages. The left-most point on the curve, closest to 0, defines the smallest fullness percentage "C." During steady state operation, the value of C may remain relatively constant from one garbage collection operation to the next. This is may be predicted by assuming that the total capacity of a single logical block is N, and the smallest fullness percentage observed from the previous sampling of fullness percentages is C. With these assumptions, the worst-case drop in a fullness of a block may be expressed as $(N/(T-F))/N=1/(T-F) \approx 0$, indicating that the value of C may be expected to stay substantially the same from one sampling to the next. However, the value of C may slowly increase over time as a number of free blocks of the storage device 2 decreases.

Figure 5:
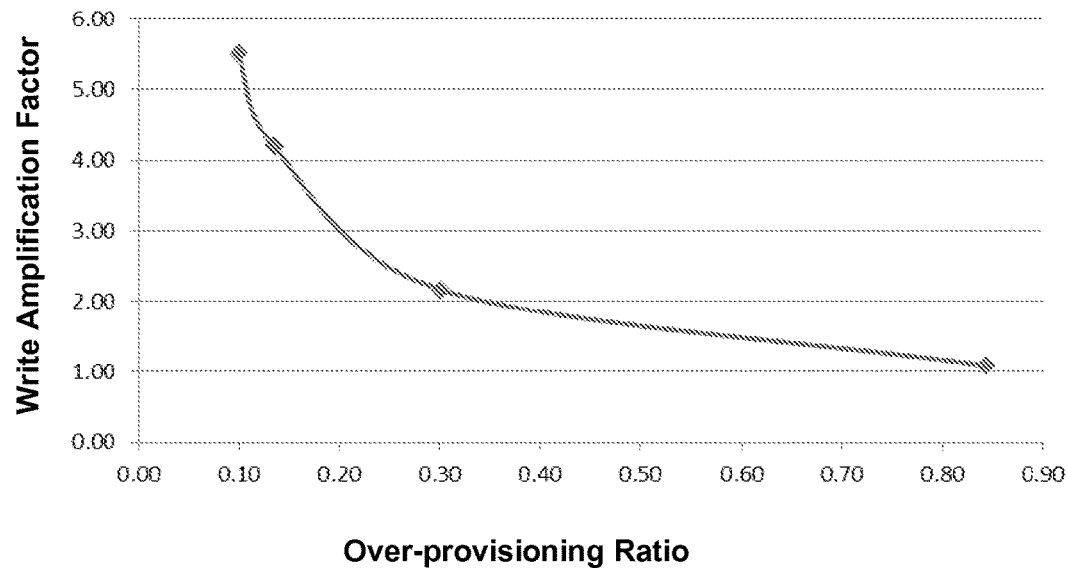
FIG. 5 is a plot of the write amplification factor as a ratio of the over-provisioning ratio, p, for an example storage device.

As described above, as blocks wear out, replacement blocks are pulled from the pool of free blocks to replace the worn blocks. This reduces the number of free blocks. Thus, as the number of worn out blocks increases, the number of free blocks decreases proportionally. FIG. 5 is a plot of the write amplification factor as a ratio of the over-provisioning ratio, p, for an example storage device. As shown in FIG. 5, as the over-provisioning ratio decreases (indicating fewer total available blocks and fewer free blocks), the write amplification factor increases. If the over-provisioning ratio (and the number of free blocks) becomes too low, wear leveling and garbage collection may be unable to maintain performance of storage device 2, and performance may not be able to recover. Thus, determining when the health of storage device 2 is deteriorating before the health deteriorates so far as to be unrecoverable is important to continued operation of storage device 2. The relationship of the worst-case write amplification factor, W, versus the over-provisioning ratio may be approximated as $W=(1+p)/(2*p)$.

Figure 6:
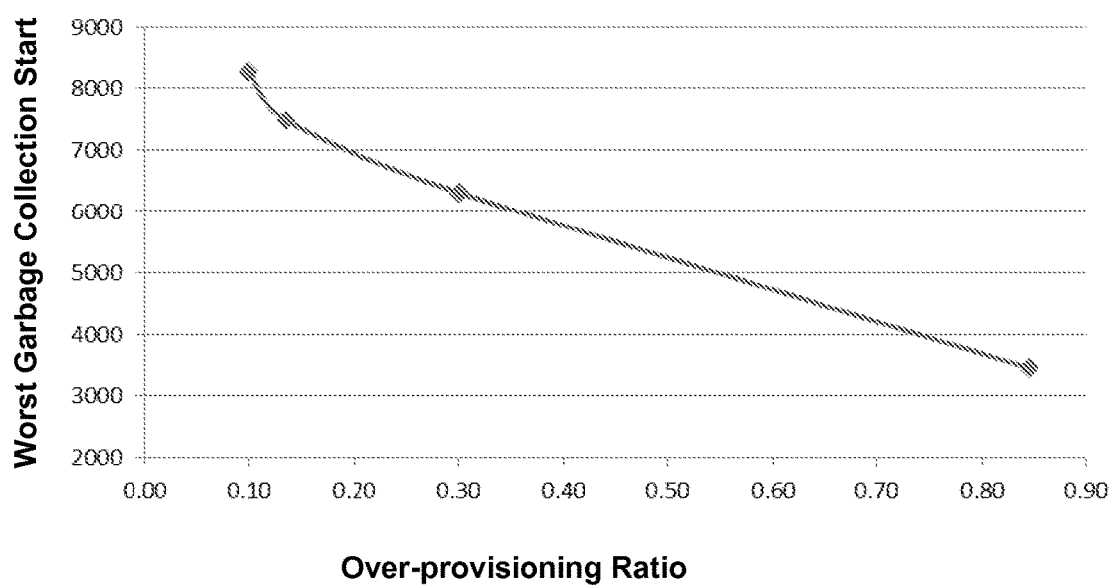
FIG. 6 is a plot of the worst garbage collection start versus over-provisioning ratio for an example storage device.

FIG. 6 is a plot of the worst garbage collection start versus over-provisioning ratio for an example storage device. As shown in FIG. 6, the worst garbage collection start increases as the over-provisioning ratio decreases, and generally correlates to the write amplification factor (shown in FIG. 5). The worst garbage collection start shown in FIG. 6 correlates to the smallest fullness percentage, C. For example, the C value is equal to the value of the worst garbage collection start divided by the total number of number of blocks. In the example of FIG. 6, the total number of blocks was 16,384, so the C value is the y-axis value shown in FIG. 6 divided by 16,384.

Maintenance module 24 may utilize the smallest fullness percentage, C, to estimate the health of storage device 2 (e.g., memory devices 12). Maintenance module 24 may compare the smallest fullness percentage, C, to a threshold value to determine whether the health of storage device 2 (e.g., memory devices 12) is deteriorating. For example, if the smallest fullness percentage, C, is greater than the threshold value, maintenance module 24 may determine that the health of storage device 2 (e.g., memory devices 12) is deteriorating.

The threshold value may be predetermined, and may be selected based on a determination or estimation of when the health of storage device 2 is deteriorating such that a predetermined action should be taken before the deterioration becomes so bad that performance of the storage device is unrecoverable. For example, the threshold value, TV, may be set as $TV=(W-1)/W$, where W is the worst-case write amplification factor. Responsive to determining that C exceeds TV, maintenance module 24 may perform at least one predetermined function, such as modifying an operating parameter of controller 20 or outputting a message or indication to host device 15.

For example, maintenance module 24 may modify an operating parameter of controller 20, such as suspending any further writes to storage device 2. Maintenance module 24 also may output an indication to host device 15 that storage device 2 is a read-only storage device, such that host device 15 will no longer output write commands to storage device 2. By converting to a read-only device, loss of data stored the storage device 2 may be avoided. As another example, controller 20 may throttle (slow) write speeds to memory devices 12 of storage device 2, allowing more time for controller 20 to perform garbage collection.

In some examples, the predetermined operation may include outputting, by maintenance module 24, an indication of the health of storage device 2 to host device 12. Host device 15 then may optionally perform one or more predetermined actions in response to receiving the indication. For example, host device 15 may be configured to throttle (reduce) write instructions to storage device 2, allowing controller 20 of storage device 2 more time to perform garbage collection operations. As another example, host device 15 may be configured to change an identification of storage device 2 to be read-only, such that host device 15 no longer sends write instructions to storage device 2. As an additional example, host device 15 may be configured to change a capacity of storage device 2 accessible to host device 15, effectively increasing the number of free blocks available to controller 20 of storage device 2 with which to perform wear leveling and garbage collection.

Figure 7:
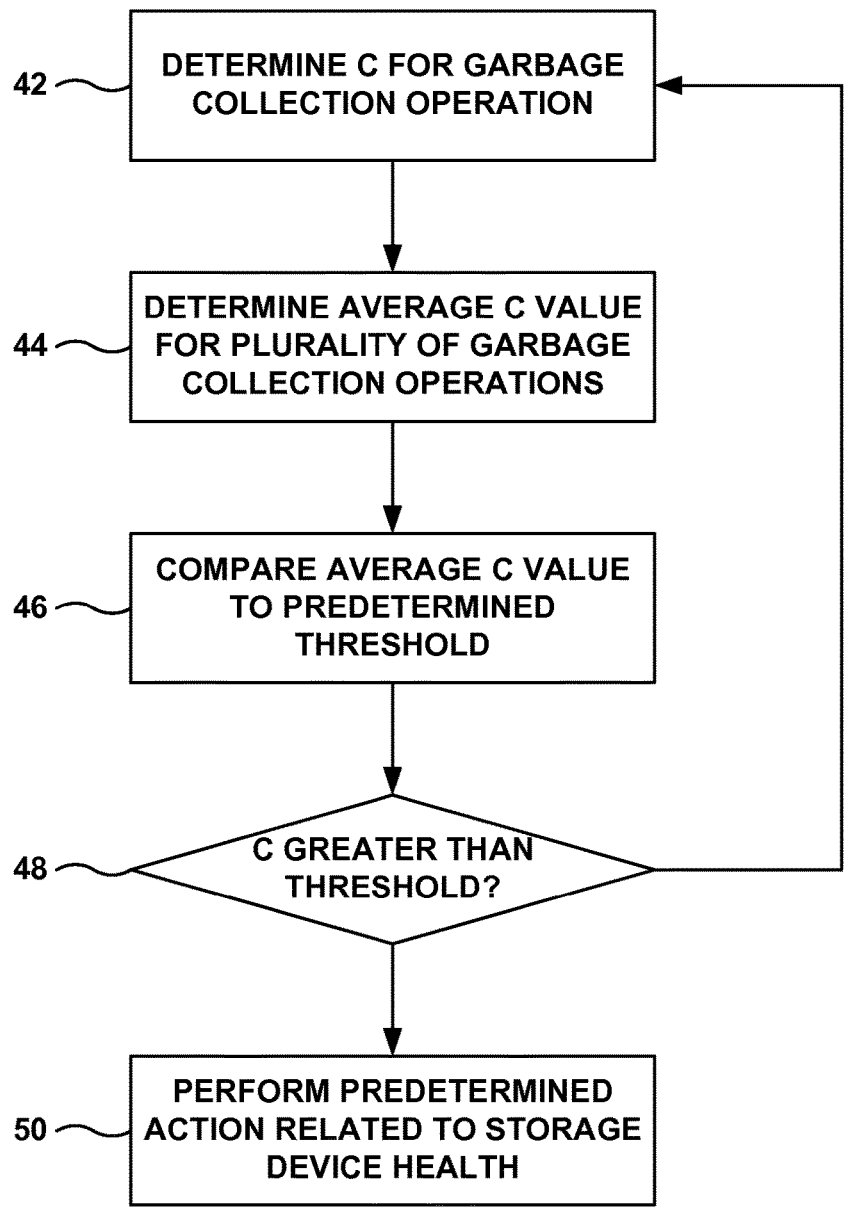
FIG. 7 is a flow diagram illustrating an example technique for estimating a health of a storage device based on a smallest fullness percentage value.

In some examples, maintenance module 24 may utilize a plurality of smallest fullness percentage values, one for each of a plurality of garbage collection operations, to determine an average smallest fullness percentage value. FIG. 7 is a flow diagram illustrating an example technique for estimating a health of a storage device based on a smallest fullness percentage value. The technique of FIG. 7 will be described with concurrent reference to storage device 2 and controller 20 of FIGS. 1 and 3 for ease of description. However, in other examples, a different storage device or controller may implement the technique of FIG. 7, storage device 2 and controller 20 of FIGS. 1 and 2 may implement a different technique for estimating a health of storage device 2, or both.

The technique of FIG. 7 may include determining, by maintenance module 24, the smallest fullness percentage, C, across all blocks (42). As described above, maintenance module 24 may determine a respective fullness percentage for each block of memory devices 12 as part of a garbage collection operation.

The technique of FIG. 7 also includes determining, by maintenance module 24, an average smallest fullness percentage value, an average C, for a plurality of garbage collection operations (44). Maintenance module 24 may determine a C value for each garbage collection operation. Maintenance module 24 may cause the C value to be stored, e.g., in a C value buffer or other data structure. In some examples, the C value buffer or other data structure may include N entries, one C value for each of the last N garbage collection operations (including the current garbage collection operation). When maintenance module 24 performs a garbage collection operation and determines a C value for the garbage collection operation, the newest C value may be place in entry 0 of the C value buffer or other data structure, and each value previously stored in the C value buffer or other data structure may be incremented one value greater (e.g., previous entry 0 becomes entry 1, previous entry N−m becomes entry N−m+1). Entry N−1, the final entry in the C value buffer or other data structure is discarded. In this way, the C value buffer or other data structure stores the C values for the last N garbage collection operations.

N, the size of the C value buffer or other data structure, may be selected so that averaging the N C values smooths the C values, reducing noise in the C value signal. Additionally, N may be selected so that the average C value incorporates only relatively recent C values. In some examples, N may be 1024. Maintenance module 24 determines the average smallest fullness percentage value (the average C value) (44) using the N C values stored in the C value buffer or other data structure. In this way, the average C value may be a moving average of the C values for the last N garbage collection operations.

FIG. 8 is a plot of the average garbage collection start versus over-provisioning ratio for an example storage device. As shown in FIG. 8, the average garbage collection start increases as the over-provisioning ratio decreases, and generally correlates to the write amplification factor (shown in FIG. 5). The average garbage collection start shown in FIG. 8 correlates to the average smallest fullness percentage, the average C. For example, the average C value is equal to the value of the worst garbage collection start divided by the total number of number of blocks. In the example of FIG. 8, the total number of blocks was 16,384, so the average C value is the y-axis value shown in FIG. 8 divided by 16,384.

Maintenance module 24 then compares the average C value to a predetermined threshold value (46). The threshold value may be predetermined, and may be selected based on a determination or estimation of when the health of storage device 2 is deteriorating such that a predetermined action should be taken before the deterioration becomes so bad that performance of the storage device is unrecoverable. For example, the threshold value, TV, may be set as TV=(W−1)/W.

Responsive to determining that the average C value exceeds TV (the "YES" branch of decision block 48), maintenance module 24 may perform at least one predetermined function (50). The predetermined function may relate to the health of storage device 2 (e.g., memory devices 12), as the average C value exceeding the TV indicates that the health of memory devices 12 is deteriorating. For example, maintenance module 24 may output a message that causes controller 20 to modify an operating parameter or output a message or instruction that is communicated to host device 15. For instance, the controller 20 may modify an operating parameter by slowing a response to a write request received from host device 15 to allow storage device 2 (e.g., controller 20) to maintain write and garbage collection operations given the current (lower) over provisioning ratio, or by converting the storage device 2 into a read-only device to prevent data loss. As another example, host device 15 may modify its operation by reducing write throughput (e.g., write instructions) to storage device 2.

However, responsive to determining that the average C value does not exceed TV (the "NO" branch of decision block 48), maintenance module 24 may begin the technique of FIG. 7 again, and may determine a C value upon performance of the next garbage collection operation (42). Maintenance module 24 may add this new C value to the C value buffer or other data structure and discard the oldest C value from the C value buffer or other data structure. Maintenance module 24 may determine the average C value (44) using the N C values stored in the C value buffer or other data structure and compare the average C value to the TV (46).

In some examples, maintenance module 24 may repeat this technique each time a garbage collection operation is performed, until the average C value exceeds the TV, at which time maintenance module 24 performs the predetermined action related to health of storage device 2 (e.g., memory devices 12) (50). In other examples, maintenance module 24 may repeat this technique periodically, e.g., after a predetermined number of garbage collection operations, rather than after every garbage collection operation.

In this way, the controller of the storage device may monitor health of the storage device in run-time using a single C value or an average C value over a plurality of garbage collection operations. This single C value or average C value is then compared to a threshold value (TV) to make a determination of health of storage device 2 (e.g., memory devices 12). Thus, the storage device health monitoring technique may be relatively light weight and low overhead. Additionally, the storage device health monitoring techniques described herein utilize a parameter tracked during garbage collection. The techniques described herein may not require determination of a write amplification factor based on actual write statistics, may allow earlier detection or prediction of deterioration of storage device health, and/or may be implemented by the storage device controller, rather than the host device.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A storage device comprising:
a plurality of memory devices logically divided into a plurality of blocks; and
a controller configured to:
 determine a respective fullness percentage for each respective block of the plurality of blocks, wherein the fullness percentage indicates valid data stored in the respective block compared to a total capacity of the respective block;
 determine the smallest fullness percentage for the plurality of respective fullness percentages; and
 responsive to determining that the smallest fullness percentage is greater than a predetermined threshold value, perform an action related to health of the storage device,
wherein the predetermined threshold value equals $(W-1)/W$, wherein $W=(1+p)/2*p$, wherein $p=(T-D)/D$, and wherein T is the total number of blocks of the storage device and D is the number of blocks accessible to a host device of the storage device for writing data to the storage device.

2. The storage device of claim 1, wherein the controller is configured to perform the action related to the health of the storage device by at least modifying an operating parameter of the controller.

3. The storage device of claim 2, wherein the controller is configured to modify the operating parameter of the controller by at least setting the storage device to a read-only state.

4. The storage device of claim 1, wherein the controller is configured to perform the action related to the health of the storage device by at least outputting an indication to a host device that causes the host device to modify at least one operating parameter.

5. The storage device of claim 1, wherein the controller is configured to, for each respective garbage collection operation of a plurality of garbage collection operations:
 determine a respective fullness percentage for each block of the plurality of blocks of the storage device;
 determine the respective smallest fullness percentage for the plurality of respective fullness percentages associated with the respective garbage collection operation;
 determine an average smallest fullness percentage based on the respective smallest fullness percentages; and
 compare the average smallest fullness percentage to the predetermined threshold value.

6. The storage device of claim 1, wherein the controller is further configured to:
 determine an average smallest fullness percentage based on the smallest fullness percentage and respective smallest fullness percentages for each of a plurality of previously performed garbage collection operations, and
 responsive to determining that the average smallest fullness percentage exceeds the predetermined threshold value, perform the action related to health of the storage device.

7. The storage device of claim 1, wherein the storage device comprises a solid state drive (SSD).

8. The storage device of claim 1, wherein the fullness percentage increases over time as a number of free blocks in the plurality of blocks decreases.

9. A method comprising:
 determining, by a controller of a storage device, a respective fullness percentage for each respective block of a plurality of blocks of the storage device, wherein the fullness percentage indicates valid data stored in the respective block compared to a total capacity of the respective block;
 determining, by the controller, the smallest fullness percentage for the plurality of respective fullness percentages; and
 responsive to determining that the smallest fullness percentage is greater than a predetermined threshold value, performing, by the controller, an action related to health of the storage device,
wherein the predetermined threshold value equals $(W-1)/W$, wherein $W=(1+p)/2*p$, wherein $p=(T-D)/D$, and wherein T is the total number of blocks of the storage device and D is the number of blocks accessible to a host device of the storage device for writing data to the storage device.

10. The method of claim 9, wherein performing the action related to the health of the storage device comprises modifying an operating parameter of the controller.

11. The method of claim 10, wherein modifying the operating parameter of the controller comprises setting the storage device to a read-only state.

12. The method of claim 9, wherein performing the action related to the health of the storage device comprises outputting an indication to a host device that causes the host device to modify at least one operating parameter.

13. The method of claim 9, further comprising, for each respective garbage collection operation of a plurality of garbage collection operations:
 determining, by the controller, a respective fullness percentage for each block of the plurality of blocks of the storage device;
 determining, by the controller, the respective smallest fullness percentage for the plurality of respective fullness percentages associated with the respective garbage collection operation;
 determining, by the controller, an average smallest fullness percentage based on the respective smallest fullness percentages; and
 comparing, by the controller, the average smallest fullness percentage to the predetermined threshold value.

14. The method of claim 9, further comprising:
 determining, by the controller, an average smallest fullness percentage based on the smallest fullness percentage and respective smallest fullness percentages for each of a plurality of previously performed garbage collection operations, and
 wherein responsive to determining that the smallest fullness percentage is greater than the predetermined threshold value, performing the action related to health of the storage device comprises responsive to determining that the average smallest fullness percentage exceeds the predetermined threshold value, performing the action related to health of the storage device.

15. A non-transitory computer-readable storage medium comprising instructions that, when executed, configure one or more processors of a storage device to:
  determine a respective fullness percentage for each respective block of a plurality of blocks of the storage device, wherein the fullness percentage indicates valid data stored in the respective block compared to a total capacity of the respective block;
  determine the smallest fullness percentage for the plurality of respective fullness percentages; and
  responsive to determining that the smallest fullness percentage is greater than a predetermined threshold value, perform an action related to health of the storage device,
  wherein the predetermined threshold value equals $(W-1)/W$, wherein $W=(1+p)/2*p$, wherein $p=(T-D)/D$, and wherein T is the total number of blocks of the storage device and D is the number of blocks accessible to a host device of the storage device for writing data to the storage device.

16. The non-transitory computer-readable storage medium of claim 15, further comprising instructions that, when executed, configure one or more processors of the storage device to:
  determine an average smallest fullness percentage based on the smallest fullness percentage and respective smallest fullness percentages for each of a plurality of previously performed garbage collection operations, and
  wherein the instructions that, when executed, configure the one or more processors of the storage device to, responsive to determining that the smallest fullness percentage is greater than the predetermined threshold value, perform the action related to health of the storage device comprise instructions that, when executed, configure the one or more processors of the storage device to, responsive to determining that the average smallest fullness percentage exceeds the predetermined threshold value, performing the action related to health of the storage device.

17. The non-transitory computer-readable storage medium of claim 15, further comprising instructions that, when executed, configure one or more processors of the storage device to:
  determine a respective fullness percentage for each block of the plurality of blocks of the storage device;
  determine the respective smallest fullness percentage for the plurality of respective fullness percentages associated with a respective garbage collection operation;
  determine an average smallest fullness percentage based on the respective smallest fullness percentages; and
  compare the average smallest fullness percentage to the predetermined threshold value.

18. A system comprising:
  means for determining a respective fullness percentage for each respective block of a plurality of blocks of the storage device, wherein the fullness percentage indicates valid data stored in the respective block compared to a total capacity of the respective block;
  means for determining the smallest fullness percentage for the plurality of respective fullness percentages; and
  means for performing, responsive to determining that the smallest fullness percentage is greater than a predetermined threshold value, an action related to health of the storage device,
  wherein the predetermined threshold value equals $(W-1)/W$, wherein $W=(1+p)/2*p$, wherein $p=(T-D)/D$, and wherein T is the total number of blocks of the storage device and D is the number of blocks accessible to a host device of the storage device for writing data to the storage device.

19. The system of claim 18, further comprising:
  means for determining an average smallest fullness percentage based on the smallest fullness percentage and respective smallest fullness percentages for each of a plurality of previously performed garbage collection operations,
  wherein the means for performing comprises means for performing, responsive to determining that the average smallest fullness percentage exceeds the predetermined threshold value, the action related to health of the storage device.

* * * * *